United States Patent

[11] 3,577,818

| [72] | Inventors | Leslie Dick Cramer<br>888 Amoretti St.;<br>John R. Moore, 558 Lincoln St., P.O. Box<br>765, Lander, Wyo. 82520 |
|---|---|---|
| [21] | Appl. No. | 861,070 |
| [22] | Filed | Sept. 25, 1969 |
| [45] | Patented | May 4, 1971 |

[54] LUG WRENCH SUPPORT
8 Claims, 2 Drawing Figs.

| [52] | U.S. Cl. | 81/180 |
|---|---|---|
| [51] | Int. Cl. | B25b 13/58 |
| [50] | Field of Search | 81/180, 53, 54 |

[56] References Cited
UNITED STATES PATENTS

| 2,459,672 | 1/1949 | Morsch | 81/180X |
|---|---|---|---|
| 2,614,444 | 10/1952 | Moore | 81/180X |
| 2,761,340 | 9/1956 | Harrington | 81/180X |
| 3,262,341 | 7/1966 | Cline et al. | 81/180 |

*Primary Examiner*—James L. Jones, Jr
*Attorney*—Craig, Antonelli, Stewart and Hill ABSTRACT: A wheel nut wrench support for use in the removal of wheels from a vehicle, particularly in connection with trucks and similarly heavy-duty vehicles, including a plate member provided with a plurality of slotted apertures distributed in an annular pattern thereon and provided additionally with multiple elements extending radially from the plate member and adapted to engage a wheel rim to support the plate member in spaced relationship with the wheel in an orientation substantially parallel to the plane of the wheel wherein the plurality of apertures are aligned axially with the plurality of wheel lugs. According to a modification of the present invention, at least one of the support elements is adjustable in length, thereby rendering the plate member useful in conjunction with wheels of different radial dimensions.

Patented May 4, 1971

3,577,818

INVENTOR
L. DICK CRAMER
JOHN R. MOORE

BY Craig, Antonelli, Stewart & Hill

ATTORNEYS

LUG WRENCH SUPPORT

BACKGROUND OF THE INVENTION

The conventional L- and X-shaped lug wrenches have proven to be satisfactory for removing the nuts from the studs of a passenger car wheel. However, wrenches of this type have not been found satisfactory when used on the wheels of a truck or similar heavy-duty vehicle. With such wrenches, it is extremely difficult to remove the wheel nuts, particularly when they have become set from long periods of disuse or have become rusted in place as is quite common in the case of large, truck-type wheels. Further, the removal of such wheels is complicated by the substantially recessed position of the studs, necessitating the use of a wrench including a socket spaced by a considerable distance from the lever to be used.

The relatively great torque required to loosen the wheel nuts practically requires the use of a relatively long effective lever arm. However, the recessed position of the nuts necessarily entails the use of a socket member which must be spaced quite far from the application of the torque by means of the lever arm employed. This compound problem generates extreme difficulty in the removal of wheels of heavy-duty vehicles and many attempts have been made heretofore to provide an effective means of supporting a lug wrench in proper alignment as the required torque is applied.

All of these prior attempts to solve these aforementioned problems have, however, met with only partial success. Thus, some of the proposed solutions have been ineffective under certain conditions or in certain locations. In this regard, reference is made to proposals involving the use of a ground-supported member providing a fulcrum for a lever arm. Some suggestions have been made involving the use of a hub-supported member, but these have generally entailed excessive manipulation in operation and have involved a plurality of working parts rendering the devices costly to produce and maintain.

Accordingly, it is an objective of the present invention to provide a device for supporting a wheel nut wrench which is supported upon the wheel itself and which is relatively simple in operation and inexpensive to produce and maintain.

Another objective of the present invention is to provide a support for a wheel nut wrench which is readily adaptable for use in conjunction with wheels of different radial dimensions.

Moreover, it is an objective of the present invention to provide a support for a wheel nut wrench which does not include any moving parts.

Finally, it is an objective of the present invention to provide a support for a wheel nut wrench which avoids those disadvantages inherent in the devices in use heretofore for a similar purpose.

SUMMARY OF THE INVENTION

The aforementioned objectives are accomplished, in accordance with the present invention, by providing a plate member with a plurality of slotted apertures distributed annularly thereabout to correspond to the annular distribution of studs about a vehicle wheel. Further, at least three support elements are affixed to the plate member and adapted to engage the wheel rim to support the plate member in parallel relationship with the plane of the wheel spaced axially from the studs of the wheel.

According to a further modification of the present invention, at least one of the support elements is adjustable in length so that the plate member can be utilized in conjunction with wheels of different radial dimensions.

BRIEF DESCRIPTION OF THE DRAWINGS

The aforementioned objectives, features and advantages of the present invention will become more readily apparent from a consideration of the detailed description hereinbelow, when considered in conjunction with the accompanying drawings, wherein.

DETAILED DESCRIPTION OF THE DRAWINGS

Figure 1:
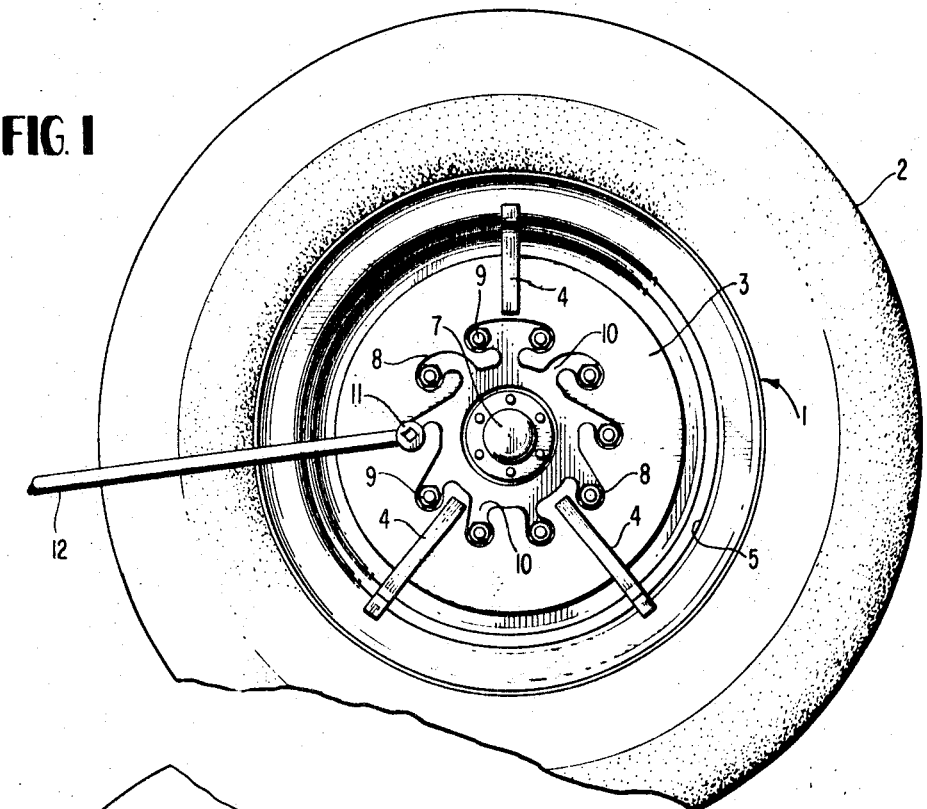
FIG. 1 represents an elevation view of a wheel with a wheel lug wrench support constructed in accordance with the present invention supported in place thereon.

In the drawings, wherein common reference numerals have been used to designate like elements, a conventional wheel is generally designated 1 and a tire 2 is mounted upon wheel 1. A plate member 3 is supported by means of support elements 4, 4a at the wheel rim 5.

The support members 4, 4a include substantially L-shaped abutment members, disposed at the radially outward extremities thereof, adapted to engage firmly with the wheel rim 5 to secure the plate member 3 in an axially spaced, substantially parallel relationship with the wheel. The opposite ends of the support members 4, 4a are secured, either rigidly or pivotably, at the plate member 3.

The central portion of the plate member 3 which is disposed axially with respect to the wheel hub 7 when the plate member is in a functional position, is cut out. Additionally, a plurality of apertures 8 are provided, the number and location of which apertures 8 correspond to the number and position of the plurality of wheel lugs 9. Each of the apertures 8 is connected with the central, cutout portion of the plate member 3 by means of slotlike passages 10 which have a minimum width large enough to accommodate the outer diametric dimension of a socket wrench 11. In the illustrated embodiments, the socket wrench 11 is represented in its functional position, engaging one of the wheel nuts and supported, at a point axially spaced therefrom, by that portion of plate member 3 defining the limits of the corresponding aperture 8.

Figure 2:
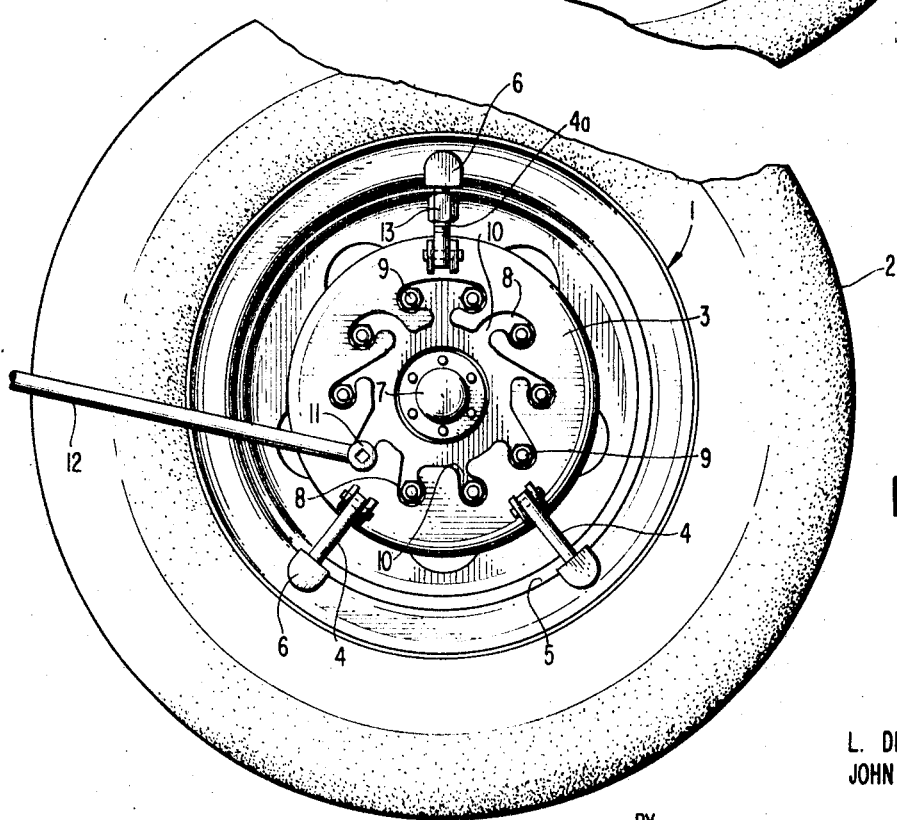
FIG. 2 represents a similar view of a modified embodiment of the present invention.

A lever arm 12 is interconnected with the socket wrench 11 and secured for rotation together therewith. The use of the relatively long lever arm 12 to apply the torque to the socket wrench 11 and, thus, to the individual wheel nuts greatly facilitates the removal of the wheel. According to the embodiment illustrated in FIG. 1, the supporting members 4 are of a fixed length. Thus, the device illustrated therein can be utilized only in conjunction with a wheel rim of a single radial dimension. In contrast thereto, the embodiment illustrated in FIG. 2 can be utilized in conjunction with wheels of different radial dimensions. In that embodiment, at least one of the support members, designated 4a, is provided with means for adjusting the length thereof, thus facilitating the attachment of the device to wheel rims of different sizes.

The means for adjusting the length of the support member 4a may be of any conventional type. In the embodiment illustrated in FIG. 2, a conventional turnbuckle 13 is incorporated for purposes of providing length adjustability.

While the present invention has been described hereinabove with reference to the specific details of but two embodiments, it is to be clearly understood that the scope of the present invention is not limited to the specific details, but is susceptible of numerous changes and modifications as would be apparent to one with normal skill in the pertinent technology.

We claim:

1. A wheel nut wrench support adapted for use in the removal of a wheel from a vehicle, comprising plate means provided with a plurality of apertures distributed annularly thereabout, the positioning of said plurality of apertures corresponding to the distribution of wheel lugs upon a vehicle wheel, said plate means including a central cutout portion and further including a plurality of slotlike passages interconnecting each of said plurality of apertures with said central cutout portion; and support means for detachably securing said plate means, at the rim portion of a vehicle wheel, in spaced parallel relationship with said wheel in an angular orientation with respect thereto such that each of said plurality of apertures is aligned axially with respect to a wheel lug.

2. A wheel nut wrench support according to claim 1, wherein the diametric dimension of each of said plurality of apertures and the width of each of said slotlike passages exceeds the outer diametric dimension of a wheel nut wrench employed in conjunction with said support.

3. A wheel nut wrench support according to claim 1, wherein said support means include a plurality of elements, each affixed, at one end thereof, to said plate member and extending radially outward therefrom, the opposite ends of each of said plurality of elements including a member adapted to firmly engage with the rim portion of a vehicle wheel.

4. A wheel nut wrench support according to claim 3, wherein each of said members adapted to engage with the rim portion of a vehicle wheel has a substantially L-shaped profile.

5. A wheel nut wrench support according to claim 3, wherein at least one of said plurality of elements is adjustable in length.

6. A wheel nut wrench support according to claim 5, wherein said at least one of said plurality of elements includes a turnbuckle.

7. A wheel nut wrench support according to claim 4, wherein at least one of said plurality of elements is adjustable in length.

8. A wheel nut wrench support according to claim 7, wherein said at least one of said plurality of elements includes a turnbuckle.